(12) United States Patent
Bird

(10) Patent No.: US 8,709,592 B2
(45) Date of Patent: Apr. 29, 2014

(54) SENSOR COATING

(75) Inventor: Colin Bird, Derby (GB)

(73) Assignee: Rolls-Royce PLC, London (GB)

(*) Notice: Subject to any disclaimer, the term of this patent is extended or adjusted under 35 U.S.C. 154(b) by 227 days.

(21) Appl. No.: 12/450,522

(22) PCT Filed: Apr. 11, 2008

(86) PCT No.: PCT/GB2008/001296
§ 371 (c)(1),
(2), (4) Date: Sep. 29, 2009

(87) PCT Pub. No.: WO2008/139136
PCT Pub. Date: Nov. 20, 2008

(65) Prior Publication Data
US 2010/0035043 A1 Feb. 11, 2010

(30) Foreign Application Priority Data

May 15, 2007 (GB) .................... 0709272.9

(51) Int. Cl.
| B32B 5/16 | (2006.01) |
| B32B 17/06 | (2006.01) |
| B32B 18/00 | (2006.01) |
| B32B 5/00 | (2006.01) |

(52) U.S. Cl.
USPC ........... 428/333; 428/323; 428/338; 428/426; 428/689; 428/690

(58) Field of Classification Search
None
See application file for complete search history.

(56) References Cited

U.S. PATENT DOCUMENTS

| 4,789,992 A * | 12/1988 | Wickersheim et al. ....... 374/161 |
| 5,036,194 A | 7/1991 | Hazel |
| 5,075,349 A * | 12/1991 | Ohba et al. ...................... 522/99 |
| 5,612,492 A * | 3/1997 | Schwab et al. ................... 73/147 |
| 6,891,330 B2 * | 5/2005 | Duggal et al. ................. 313/511 |
| 2002/0110180 A1* | 8/2002 | Barney et al. .................. 374/161 |
| 2006/0001341 A1 | 1/2006 | Jin et al. |
| 2006/0060862 A1* | 3/2006 | Bawendi et al. ................. 257/76 |

FOREIGN PATENT DOCUMENTS

| EP | 0 130 337 A2 | 1/1985 |
| EP | 0 872 525 A1 | 10/1998 |
| GB | 1049516 | 11/1966 |
| JP | 60-11103 | 1/1985 |
| JP | 4-86701 | 3/1992 |
| JP | 2002-323613 | 11/2002 |
| WO | WO 01/92843 A2 | 12/2001 |
| WO | WO 01/98741 A2 | 12/2001 |
| WO | WO 2005/004245 A2 | 1/2005 |
| WO | WO 2005/043099 A1 | 5/2005 |
| WO | WO 2007/028961 A1 | 3/2007 |

OTHER PUBLICATIONS

Oct. 24, 2012 Office Action issued in Japanese Patent Application No. 2010-507963 (with English translation).

* cited by examiner

Primary Examiner — Callie Shosho
Assistant Examiner — Cheng Huang
(74) Attorney, Agent, or Firm — Oliff PLC

(57) ABSTRACT

A retro-reflective sensor coating arrangement comprises a base layer of luminescent sensor material and an outer layer of optical bodies, such a spheres.

15 Claims, 2 Drawing Sheets

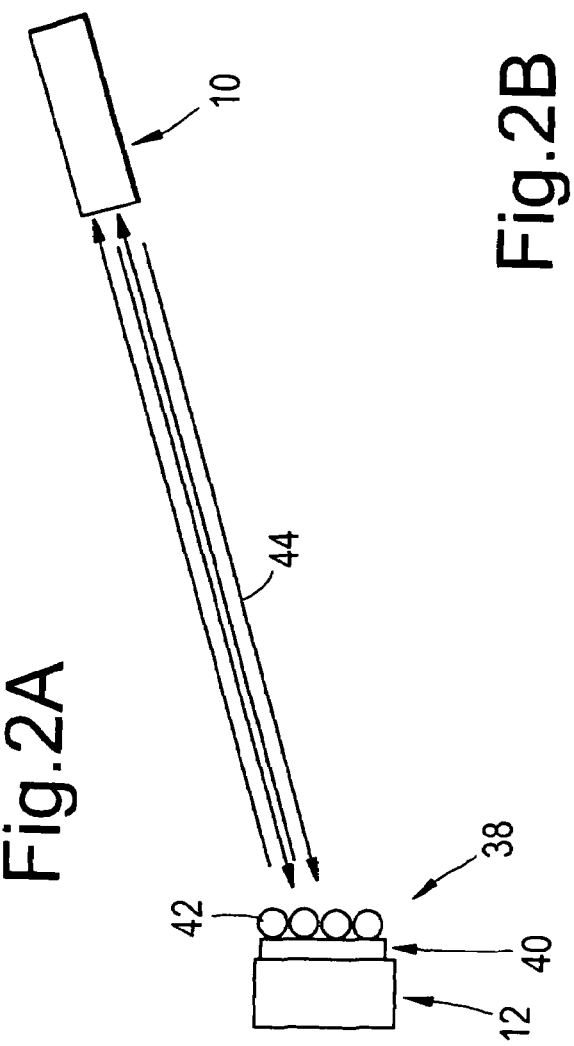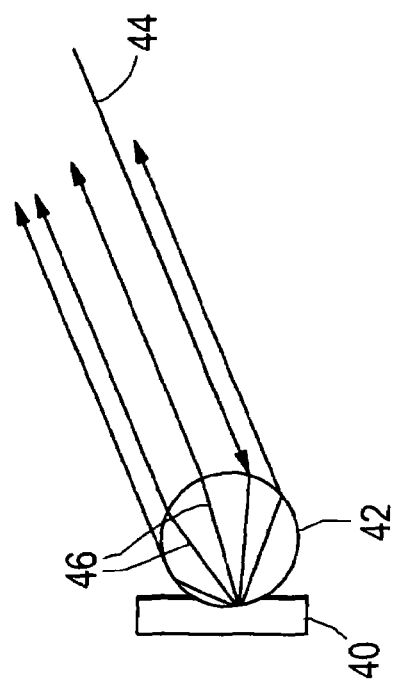

SENSOR COATING

The present invention relates to a retro-reflective coating for use in sensing the temperature of a component, for example an aerofoil of a gas turbine engine or a furnace wall.

A variety of techniques are known that use a sensor coating capable of modifying an incoming stimulation light in some way. The coating is applied to a surface of a component to be measured and is interrogated by a remote probe. Examples include:

a) pressure and temperature sensitive paints, which use a sensor coating that gives out a signal light with a modified spectral content that varies with the measurement parameter or gives out signal light at a different wavelength than the stimulation light and exhibits a decay lifetime that varies with the measurement parameter;

b) thermographic phosphors, which function similarly to temperature sensitive paints and can work either by variation of decay lifetime of the emitted light or by variation of spectral content of signal light;

c) liquid crystals, which may be used to measure temperature by modifying the spectral content of the stimulation light giving colour changes.

In the above techniques the emitted signal light is emitted equally into all angles away from the sensor coating. Only the very small range of angles occupied by the collection optics results in a signal, the rest is wasted. This means that the signal reduces in amplitude as $1/(\text{probe to surface distance})^2$ i.e. $1/r^2$. Hence the signal diminishes rapidly with increasing distance between the probe and the target that reduces the signal to noise ratio of the measurements. This effect either imposes a maximum distance over which the measurements can be performed or reduces accuracy or time resolution or temperature measurement range of the measurements.

Therefore it is an object of the present invention to provide a sensor coating that increases the amount of emitted signal light in a particular direction for collection and processing.

In accordance with the present invention there is provided a retro-reflective sensor coating arrangement comprising a base layer of sensor material and characterised by a plurality of optical bodies in or on the base layer.

Preferably, the sensor material is any one of the group comprising phosphor, or pressure sensitive paint or temperature sensitive paint or a liquid crystal.

Preferably, the optical bodies are spheres.

Preferably, the optical bodies are made from any one of more of the materials from the group comprising plastic, glass or other ceramic, fused silica or sapphire.

In certain circumstances, for example a gas turbine blade, the diameter of the optical bodies are between 5 and 50 microns.

Preferably, the base layer may be up to 50 microns thick. When used on a gas turbine blade it is preferable for the base layer to be about 25 microns thick.

Advantageously, the optical bodies are included in the base layer that is applied to the component.

Alternatively, the optical bodies are adhered to or part of a sheet material that is applied over the base layer.

Alternatively, the optical bodies are included in a clear matrix which is painted over the base layer.

BRIEF DESCRIPTION OF DRAWINGS

The present invention will be more fully described by way of example with reference to the accompanying drawings in which:

FIG. 2A is a schematic arrangement of a retro-reflective sensor coating in accordance with the present invention;

FIG. 2B is an enlarged view of the retro-reflective sensor coating.

Referring to FIG. 1, a schematic luminescence thermometry arrangement 10 is shown in use for measuring a gas turbine engine component 12. The arrangement 10 comprises a laser 14 having optical equipment 16 to process its beam along an illumination fibre 18 and through further optics 20 before being directed onto a sensor coating on the component 12. In this exemplary embodiment the sensor coating is a luminescent material but other materials as known in the art may be used. The luminescence signal passes through the optics 20 and into a signal bundle 22, through a filter 24 and into a photomultiplier 26. The signal from the photomultiplier 26 is then processed by a digitizing oscilloscope 28, before being graphically converted on a computer 30.

Figure 1:
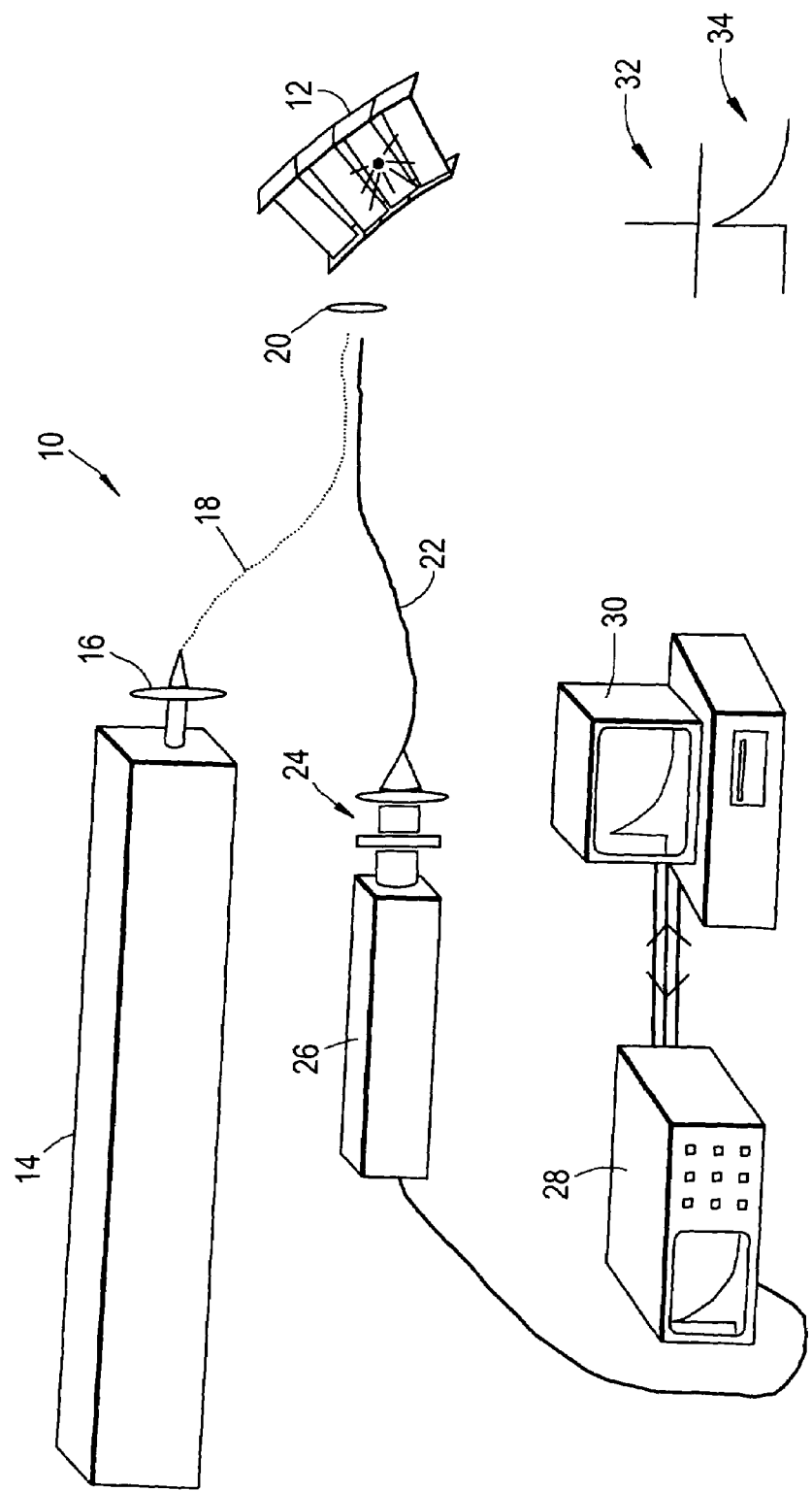
FIG. 1 is a schematic luminescence thermometry arrangement for measuring a gas turbine engine component.

Typical outputs signals are shown referenced 32 and 34 for the laser and the sensor coating output signals respectively. The graphs show intensity against time, with the laser signal 32 being almost instantaneous whereas the sensor coating's output 34 decays over a longer period of time. The output 34 from the sensor coating, in this case a phosphor material, is responsive to its temperature and is therefore indicative of the component's 12 temperature.

Referring now to FIGS. 2A and 2B the present invention is a retro-reflective sensor coating arrangement 38 comprising a base layer 40 of sensor material adjacent the component 12 and comprises an outer layer of optical bodies 42 adhered to the base layer 40.

A similar luminescence thermometry arrangement 10 may be used as described above and generally indicated at 10.

The incoming stimulation light beam 44 passes through the optical body 42 and interacts with sensor layer 40 where the signal light 46 is emitted equally into all angles. However, the signal light 46 is refracted and collimated by the optical body 42 and directed back in the direction of the luminescence thermometry arrangement 10.

In this way a significantly greater amount of the emitted signal light 46 is incident on the light collection equipment (i.e. the end of the signal bundle 22). Therefore the collected signal light 46 is stronger and may be observed more easily, particularly in difficult conditions such as those found in gas turbine engines and other polluted environments. Equally an improved signal will produce a more accurate reading than the prior art arrangements. In some circumstances it will be an advantage to be able to place the illumination fibre 18 and signal bundle 22 further away from the component being measured, for example in particularly hot environments.

The sensor material may be any one of the group comprising phosphor, or pressure sensitive paint or temperature sensitive paint or a liquid crystal.

The optical bodies are made from sapphire, which has particularly good high temperature properties useful for gas turbine engine applications. However, other materials may be used including any one or more of the materials from the group comprising plastic, glass, or fused silica.

The diameter of the optical bodies 42 is chosen such that they are larger than the wavelength of the stimulating and signal light/radiation so that interference and diffraction effects are minimized and preferably avoid altogether. The diameter of the optical bodies 42 is also chosen such that they are small enough to acceptably limit the effect of heat exchange between component and its surroundings either through conductive or radiative means. In the case of application to a turbine blade, the optical bodies are preferably small enough not to adversely affect airflow over the surface. For a turbine blade one possible range of diameters for the optical bodies is between 5 and 50 microns.

In practice the optical bodies may be spread over the sensor material once applied and before it sets, thus securing the optical bodies. Alternatively, the optical bodies may be included in the sensor material, which is then painted on the component. It should be noted that some of the optical bodies may be completely covered or substantially covered by the sensor material and therefore essentially useless. However, a significant proportion will be visible to the stimulating and signal light/radiation.

For a turbine blade application the sensor coating is preferably about 25 microns thick, but thicknesses up to 50 microns are still particularly useful. This is particularly thin to limit aerodynamic disruption otherwise caused.

As an alternative, the optical bodies may be adhered to or part of a sheet material that is then applied over the base layer/sensor coating. Still further the optical bodies 42 may be included in a clear matrix which is then painted over the base layer.

The invention claimed is:

1. A luminescence thermometry arrangement comprising a stimulation light beam source, a base layer of luminescent sensor material and a plurality of optical bodies in or on the base layer, wherein when an incoming stimulation light beam passes through the plurality of optical bodies and interacts with the base layer of luminescent sensor material, whereby a luminescence signal light is generated indicative of at least one of temperature and pressure of the base layer, and the luminescence signal light is refracted and collimated by the plurality of optical bodies and directed back to the luminescence thermometry arrangement.

2. The luminescence thermometry arrangement as claimed in claim 1, wherein the luminescent sensor material is selected from the group consisting of phosphor, pressure sensitive paints, temperature sensitive paints, and liquid crystals.

3. The luminescence thermometry arrangement as claimed in claim 1, wherein the plurality of optical bodies are spheres.

4. The luminescence thermometry arrangement as claimed in claim 1, wherein the plurality of optical bodies are made from any one or more of the materials selected from the group consisting of plastic, glass and other ceramics, fused silica and sapphire.

5. The luminescence thermometry arrangement as claimed in claim 1, wherein a diameter of the plurality of optical bodies is between 5 and 50 microns.

6. The luminescence thermometry arrangement as claimed in claim 1, wherein the base layer is up to 50 microns thick.

7. The luminescence thermometry arrangement as claimed in claim 6, wherein the base layer is about 25 microns thick.

8. The luminescence thermometry arrangement as claimed in claim 1, wherein the plurality of optical bodies are included in the base layer that is applied to a component.

9. The luminescence thermometry arrangement as claimed in claim 1, wherein the plurality of optical bodies are adhered to or part of a sheet material that is applied over the base layer.

10. The luminescence thermometry arrangement as claimed in claim 1, wherein the plurality of optical bodies are included in a clear matrix which is painted over the base layer.

11. The luminescence thermometry arrangement as claimed in claim 1, wherein the luminescence signal light that is generated decays, indicative of at least one of temperature and pressure of the base layer.

12. The luminescence thermometry arrangement as claimed in claim 1, wherein a reflected signal light is also generated.

13. The luminescence thermometry arrangement as claimed in claim 1, wherein the plurality of optical bodies are made from fused silica or sapphire.

14. The luminescence thermometry arrangement as claimed in claim 1, wherein the stimulation light beam source is a laser.

15. The luminescence thermometry arrangement as claimed in claim 14, wherein the laser comprises optical equipment to process the stimulation light beam.

* * * * *